United States Patent [19]

Schulz

[11] Patent Number: 5,295,170
[45] Date of Patent: Mar. 15, 1994

[54] NUCLEAR REACTOR WITH PASSIVE MEANS OF ADJUSTING THE PH OF POST ACCIDENT WATER

[75] Inventor: Terry L. Schulz, Murrysville Boro, Pa.

[73] Assignee: Westinghouse Electric Corp., Pittsburgh, Pa.

[21] Appl. No.: 72,375

[22] Filed: Jun. 7, 1993

[51] Int. Cl.⁵ .................................... G21C 9/00
[52] U.S. Cl. .......................... 376/309; 376/282
[58] Field of Search ............... 376/245, 250, 254, 277, 376/282, 305, 306, 308, 309

[56] References Cited

U.S. PATENT DOCUMENTS

| | | | |
|---|---|---|---|
| 3,819,476 | 6/1974 | Pocock et al. | 376/282 |
| 4,609,523 | 9/1986 | Gerlowski | 376/309 |
| 5,154,876 | 10/1992 | Ehrke et al. | 376/282 |

Primary Examiner—Daniel D. Wasil
Attorney, Agent, or Firm—J. C. Valentine

[57] ABSTRACT

A nuclear reactor has a passive system for adjusting the pH of post accident water in the containment vessel. A basic liquid is stored in the containment vessel at an elevation above the maximum post accident water level. When radiation levels in the containment vessel exceed a predetermined, normal level the basic liquid is gravitationally drained into sumps located in the containment vessel below the maximum post accident water level where it mixes with emergency core cooling system water, raising the pH of the water to about 7.

19 Claims, 2 Drawing Sheets

NUCLEAR REACTOR WITH PASSIVE MEANS OF ADJUSTING THE PH OF POST ACCIDENT WATER

BACKGROUND OF THE INVENTION

This invention relates to techniques for adjusting the pH of post accident containment water in nuclear power plants, and in particular passive techniques.

Nuclear power plants are generally provided with reactor containment vessels that surround the nuclear reactor core and steam generators attached to the core. Water, either pressurized or boiling, circulates through the core, extracting heat from the core for the generation of power. Following an accident that involves the loss of reactor coolant, an emergency core cooling system (ECCS) fills the reactor core with water to a level such that the core is covered. It is possible for the core to suffer some damage in such an accident, and, in the case where the safety injection system fails, to suffer significant damage.

After an accident, radioactive iodine present in the containment vessel can change from a particulate form, such as CeI salts, to a more volatile organic form. The organic form of iodine behaves like a gas and is more likely to leak out of the containment vessel, thereby resulting in greater releases of radioactivity from the plant. Adjusting the pH of the water in the containment vessel prevents the radioactive iodine from changing into the organic form. Therefore, during and after such accidents, it is necessary to adjust the pH of the water that is in the containment sump in order to limit the amount of radiation released from the plant.

Initially after an accident, the pH of the water in the containment vessel may be as low as 3. In order to prevent the formation of significant amounts of organic iodine the pH must be raised to a value of about 7. In current plants, the pH of the post accident water is adjusted by the addition of chemicals such as sodium hydroxide. This is typically accomplished by the use of containment spray pumps to inject sodium hydroxide along with the spray water from the ECCS. This provides an effective means of adjusting the pH. However, this means of injection is subject to some of the same failure mechanisms that can cause the failure of the safety injection system. Some of the common cause failure mechanisms include the complete loss of all AC power, the complete loss of all cooling water, or the complete loss of all ventilation systems.

In some recent advanced nuclear reactors, pumps are not used in the safety systems, and in some passive plants there is no spray system at all. Therefore, a different means of adjusting the pH is required.

One approach is to place water permeable sacks of NaOH crystals in the ECCS sump. When the sump is flooded, the NaOH dissolves in the water. However, this passive system suffers serious drawbacks. First, the NaOH is very caustic and must be isolated from equipment. Second, accidental water spills in the containment vessel could activate this type of passive system, necessitating expensive clean-up procedures to remove the NaOH and to repair any damaged equipment. Third, the sacks must be checked for leaks and replaced frequently. Therefore, it would be advantageous to provide a passive pH adjustment system that overcomes the above stated problems.

SUMMARY OF THE INVENTION

An object of this invention to provide a method of adjusting the pH of post accident water in a nuclear reactor containment vessel.

An additional object of this invention is to provide a nuclear reactor having a means of adjusting the pH of post accident water in a nuclear reactor containment vessel that does not depend upon the safety injection system.

It is a further object of this invention to provide a passive means of adjusting the pH of post accident water in the nuclear reactor containment vessel that will be activated only in an emergency situation.

According the invention, a nuclear reactor is placed within a containment vessel. Means are provided for elevating the pH of post accident water in the containment vessel. A tank containing a basic liquid, such as liquid sodium hydroxide, is located within the containment vessel at an elevation above the maximum post accident water level. A sensor provides a signal indicative of an elevated radiation condition within the containment vessel that is greater than a predetermined, normal operating radiation level. If the sensor detects a radiation condition much greater than the normal operating range of the nuclear reactor, it triggers an explosive squib valve attached to the bottom of the tank. This allows the basic liquid contained within the tank to drain by gravity into the containment vessel. The basic liquid is directed by routing means from the tank to two spaced apart pH sumps in the containment vessel. Each of the pH sumps is located proximate to a safety injection sump. The pH sumps are capable of holding the entire contents of the tank. A vacuum breaker is positioned near the top of the tank. Opening the vacuum breaker allows the basic liquid to more easily drain from the tank after the explosive valve has opened.

DETAILED DESCRIPTION OF THE INVENTION

Figure 1:
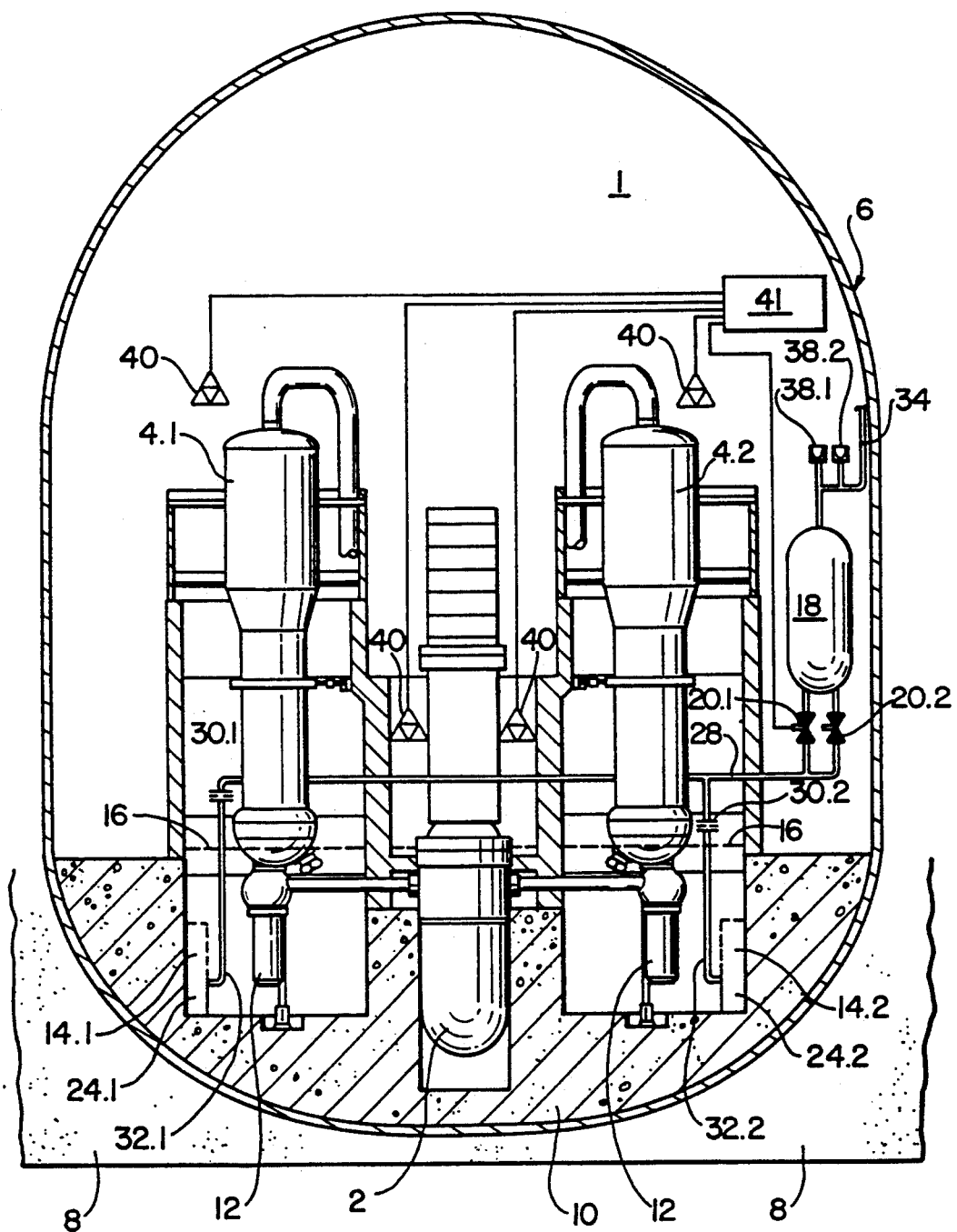
FIG. 1 is an elevational section of the nuclear reactor of this invention.

Referring to FIG. 1, a nuclear reactor 1 of the present invention features a reactor vessel 2 and steam generators 4.1, 4.2 enclosed within a containment vessel 6. The containment vessel is supported by a concrete foundation 8. Concrete 10 within the containment vessel defines spaces for the reactor vessel and the primary coolant pumps 12 on the lower ends of the steam generators. Sumps 14.1, 14.2 for the ECCS Water are defined by the concrete 10 proximate to the steam generators 4.1, 4.2. Also within the containment vessel is a water storage tank (not shown) for the ECCS and a passive heat exchanger (not shown) within the ECCS water storage tank. The water tank has a capacity of about 600,000 gallons. After a loss of core coolant accident, the water from the water tank is dumped into the containment vessel 6. The maximum post accident water level 16 is depicted by a broken line.

Figure 2:
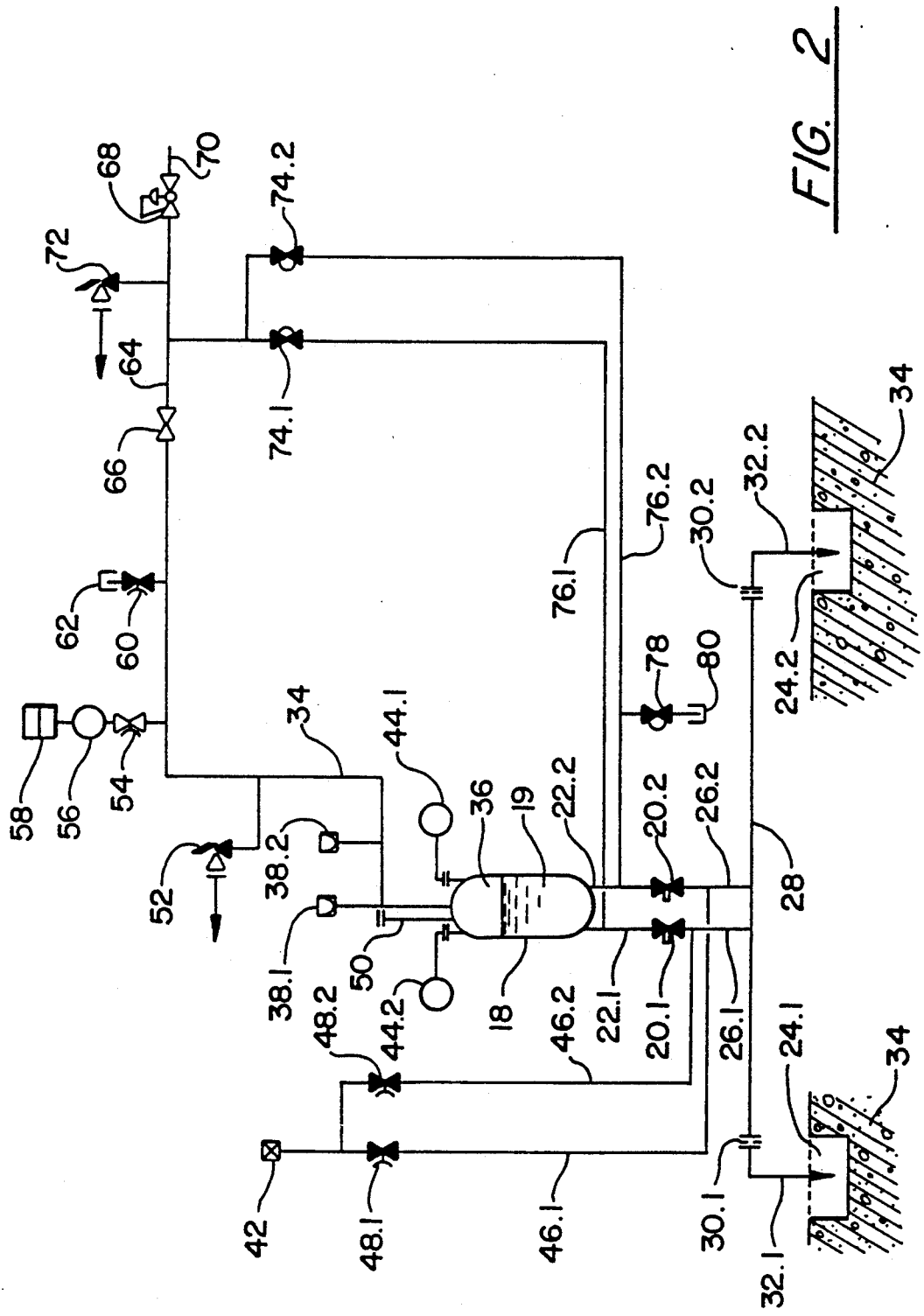
FIG. 2 is a plumbing schematic of the means for adjusting the pH of post accident water in the containment vessel.

Referring now also to FIG. 2, located above the maximum post accident water level 16 is a stainless steel pH tank 18 having a capacity of about 160-200 ft$^3$, depending upon the size of the reactor. During normal operation of the reactor 1, the pH tank 18 is about 80-85% filled with liquid NaOH 19. Extending from the bottom end of the pH tank 18 are two tubes 22.1, 22.2 connecting the tank to the inlets of two squib valves 20.1, 20.2. The outlets of the squib valves 20.1, 20.2 connect to routing means for directing the NaOH 19 from the pH tank 18 to spaced apart pH sumps 24.1, 24.2 located in the containment. Fluid lines 26.1 and 26.2 both feed into a common line 28. The common line 28 connects to two flow adjustment orifices 30.1, 30.2 that in turn connect to sump injection lines 32.1, 32.2. Lines 32.1, 32.2 are open at their other ends, opposite the flow adjustment orifices 30.1, 30.2, such that any fluid within them may gravitationally drain into pH sumps 24.1, 24.2.

The upper end of the pH tank 18 is connected to nitrogen gas line 34. The liquid NaOH 19 in the pH tank 18 is covered with a slight overpressure of $N_2$ gas 36. In gas communication with the pH tank 18 via line 34 are two vacuum breakers 38.1, 38.2.

Four radiation monitors 40 (see FIG. 1) are located at dispersed points within the containment vessel 6. Each of the monitors provides a radiation signal indicative of a radiation condition to a logic circuit 41. When the radiation signals from at least two of the monitors 40 exceed predetermined levels (orders of magnitude above normal levels), the logic circuit 41 provides a trigger signal to both squib valves 20.1, 20.2. The trigger signal activates the explosive squib valves 20.1, 20.2, thereby opening them. The NaOH 19 in the pH tank 18 gravitationally drains through lines 22.1, 22.2, squib valves 20.1, 20.2, lines 26.1, 26.2, common line 28, flow adjustment orifices 30.1, 30.2, and sump injection lines 32.1, 32.2 into pH sumps 24.1, 24.2. The initial outflow of NaOH from the tank creates a partial vacuum, opening the vacuum breakers 38.1, 38.2 to admit air to the tank 18 to aid in draining. The pH sumps 24.1, 24.2 are located in close proximity to the ECCS sumps 14.1, 14.2 such that the NaOH will mix with ECCS water quickly. In a preferred embodiment, the pH sumps are at the bottom of the ECCS sumps, 14.1, 14.2, as depicted in FIG. 1, such that ECCS water circulating from the ECCS sumps through a network of circulation pipes (not shown) to other areas of the containment mix with NaOH in the pH sumps.

Radiation monitors 40 are well know in the art of nuclear reactor design, as is the logic circuitry 41 for triggering the squib valves 20.1, 20.2. These instruments and the squib valves may be operated from their own dedicated power supply so that they will not be subject to common cause failure with other reactor systems.

The pH sumps 24.1, 24.2 have a combined volume sufficient to hold the contents of the pH tank 18. The flow adjustment orifices 30.1, 31.2 are pre-set such that each pH sump receives the same amount of NaOH. In setting up the system, or at any later time prior to an accident that activates the system, the flow can be adjusted to a proper balance by feeding demineralized water to flow adjustment orifices 30.1, 30.2, measuring the existing flow characteristics, determining the desired balance and flow rate, and changing the flow adjustment orifices accordingly. The demineralized water enters the system through port 42. The line leading from port 42 splits into lines 46.1 and 46.2 that feed into lines 26.1 and 26.2, respectively. The water then enters common line 28 that feeds the flow adjustment orifices 30.1, 30.2. Water valves 48.1, 48.2 in lines 46.1, 46.2 are shut in normal reactor operation and are only opened for flow adjustment or to flush out the lines.

The pH tank 18 has a pair of fluid level monitors 44.1, 44.2. The monitors can be heated thermocouples having multiple set points to indicate different fluid levels. The outputs of the monitors are displayed in the control room (not shown). A fill line 50 is also provided for the pH tank 10.

The $N_2$ gas 36 that fills the space in the pH tank 18 above the liquid NaOH 19 is provided as a nonreactive cover for the NaOH. Otherwise, if air containing water vapor were allowed to enter the pH tank 18, the water vapor would degrade the NaOH. Air is prevented from entering the tank by maintaining an overpressure of about 10-20 PSI in gas line 34. The overpressure also ensures that the vacuum breakers 38.1, 38.2 will not open accidentally.

$N_2$ gas line 34 is provided with a relief valve 52, and with a vent 62 that can be connected to a vacuum line (not shown). The vent 62 is normally capped and valved off by valve 60. Pressure sensor 56 connected to line 34 provides a signal indicative of the $N_2$ gas pressure to a pressure display 58 in the control room. The pressure sensor 56 can be valved off from line 34 by valve 54. $N_2$ gas is fed from source 70 into line 34 via line 64. Valve 68 connects the source 70 to line 64, and valve 66 connects lines 34 and 64. The $N_2$ gas source 70 can be a pressurized tank (not shown). Line 64 has relief valve 72 connected to it.

Means are provided to check for blockages in lines 22.1, 22.2 with $N_2$ gas. Line 64 branches into lines 76.1, 76.2, which can be valved off by valves 74.1, 74.2. Lines 76.1 and 76.2 connect at their other ends to lines 22.1 and 22.2, respectively, just above squib valves 20.1, 20.2. By closing valve 66 and opening valve 74.1, $N_2$ gas will flow through line 76.1 into line 22.1 and, if that line is clear, bubble up through the NaOH 19 in the pH tank 18 and vent through relief valve 52. Line 22.2 can be checked in a similar fashion by opening valve 74.2 instead of valve 74.1.

Also provided is means for sampling the contents of pH tank 18. Line 80, connecting to and extending down from line 76.2 at an elevation below the bottom of the pH tank 18, is provided with a valve 78 to extract fluid from the line. The open end of line 80 is normally capped when not in use.

All fluid and gas lines, like the pH tank, should be of a durable, corrosion resistant material. Stainless steel tubes of $\frac{3}{4}''-1''$ nominal diameter are preferred.

One can readily appreciate from the foregoing discussion that the passive means of adjusting the pH of post-accident water is highly redundant for additional reliability. For example, there are two squib valves, two vacuum breakers, and two fluid lines from the pH tank to direct the NaOH to two pH sumps.

Active elements in the system are kept to a minimum, reducing the chances of common cause failures. With the benefit of the foregoing, one skilled in the art may be able to make modifications to the invention in whole or in part, in addition to those set forth, without departing from the true scope and spirit of the invention set forth in the claims.

I claim:

1. A nuclear reactor, comprising a containment vessel that may be flooded to a maximum post accident water level, a reactor core contained within the containment vessel and means for adjusting the pH of post accident water in the containment vessel, characterized in that the means for adjusting the pH comprises:

a tank for containing a basic substance located at an elevation above the maximum post accident water level;

means for providing a first signal indicative of a radiation level within the containment vessel greater than a predetermined radiation level; and valve means in fluid communication with the tank for allowing the basic substance to drain by gravity into the the containment vessel in response to the first signal.

2. The nuclear reactor of claim 1, wherein the valve means is an explosive squib valve.

3. The nuclear reactor of claim 1, wherein the means for adjusting the pH is further characterized by routing means for directing the basic substance to spaced apart locations in the containment vessel below the maximum post accident water level.

4. The nuclear reactor of claim 3, wherein the containment vessel is characterized by pH sumps located at the spaced apart locations being capable of holding the entire contents of the tank.

5. The nuclear reactor of claim 4, Wherein each pH sump is located proximate to a safety injection sump.

6. The nuclear reactor of claim 1, wherein the tank comprises means for sampling the contents of the tank.

7. The nuclear reactor of claim 1, wherein the basic substance is liquid NaOH.

8. The nuclear reactor of claim 7, wherein the valve means is an explosive squib valve.

9. The nuclear reactor of claim 8, wherein the means for adjusting the pH is further characterized by routing means for directing the basic substance to spaced apart locations in the containment vessel below the maximum post accident water level.

10. The nuclear reactor of claim 9, wherein the containment vessel is characterized by pH sumps located at the spaced apart locations being capable of holding the entire contents of the tank.

11. The nuclear reactor of claim 10, wherein each pH sump is located proximate to a safety injection sump.

12. The nuclear reactor of claim 11, wherein the tank comprises means for sampling the contents of the tank.

13. The nuclear reactor of claim 12, wherein the tank comprises a vacuum breaker positioned proximate a top end of the tank.

14. The nuclear reactor of claim 13, wherein the means for adjusting the pH further comprises:

means for providing an atmosphere of a non-reactive gas to the tank for preventing degradation of the liquid NaOH.

15. A nuclear reactor, comprising a containment vessel that may be flooded to a maximum post accident water level, a reactor core contained within the containment vessel, first and second ECCS sumps within the containment vessel, and means for adjusting the pH of post accident water in the containment vessel; characterized in that the means for adjusting the pH comprises:

(a) a tank being capable of containing sufficient liquid NaOH to adjust the pH of post accident water in the containment vessel to about 7 and located at an elevation above the maximum post accident water level;

(b) first and second pH sumps together being capable of holding the contents of the tank located proximate the ECCS sumps;

(c) sensor means for providing a trigger signal, characterized by:
 (i) a plurality of spaced apart radiation sensors in the containment vessel, each radiation sensor being capable of providing a radiation signal indicative of a radiation level at the sensor; and
 (ii) logic means for providing a trigger signal in response to receiving radiation signals indicative of radiation levels in excess of predetermined radiation levels from at least two of the radiation sensors;

(d) first and second drain lines extending downward from and in fluid communication with a lower end of the tank;

(e) first and second squib valves connected to the first and second drain lines respectively and responsive to the trigger signal;

(f) third and fourth drain lines extending downward from the first and second squib valves respectively;

(g) means for routing the contents of the tank to the first and second pH sumps in about equal proportions.

16. The nuclear reactor of claim 15, wherein the means for routing the contents of the tank comprises:

(i) a common line connected to the third and fourth drain lines at their lower ends;

(ii) first and second flow adjustment means connected to the common line;

(iii) a first director line connected at a first end to the first flow adjustment means and extending downward to the first pH sump at an open second end; and (iv) a second director line connected at a first end to the second flow adjustment means and extending downward to the second pH sump at an open second end;

17. The nuclear reactor of claim 15, wherein the means for adjusting the pH further comprises a gas line connected to the tank for providing $N_2$ gas to the interior of the tank.

18. The nuclear reactor of claim 15, wherein the means for adjusting the pH further comprises first and second vacuum breakers in gas communication with the upper end of the tank.

19. A method of adjusting the pH of post accident water in a nuclear reactor, the nuclear reactor being characterized by a containment vessel that is capable of being flooded to a maximum post accident water level and a reactor core located within the containment vessel at an elevation below the maximum post accident water level, comprising the steps of:

storing a basic liquid in the containment vessel at an elevation above the maximum post accident water level;

monitoring the radiation level within the containment vessel; and draining the basic liquid by gravity to a location in the containment vessel below the maximum post accident water level when the monitored radiation level exceeds a predetermined radiation level.

* * * * *